April 13, 1948.   J. R. JOHNSON   2,439,517
INDUCTION HEATING APPARATUS
Filed Nov. 10, 1945   2 Sheets-Sheet 1
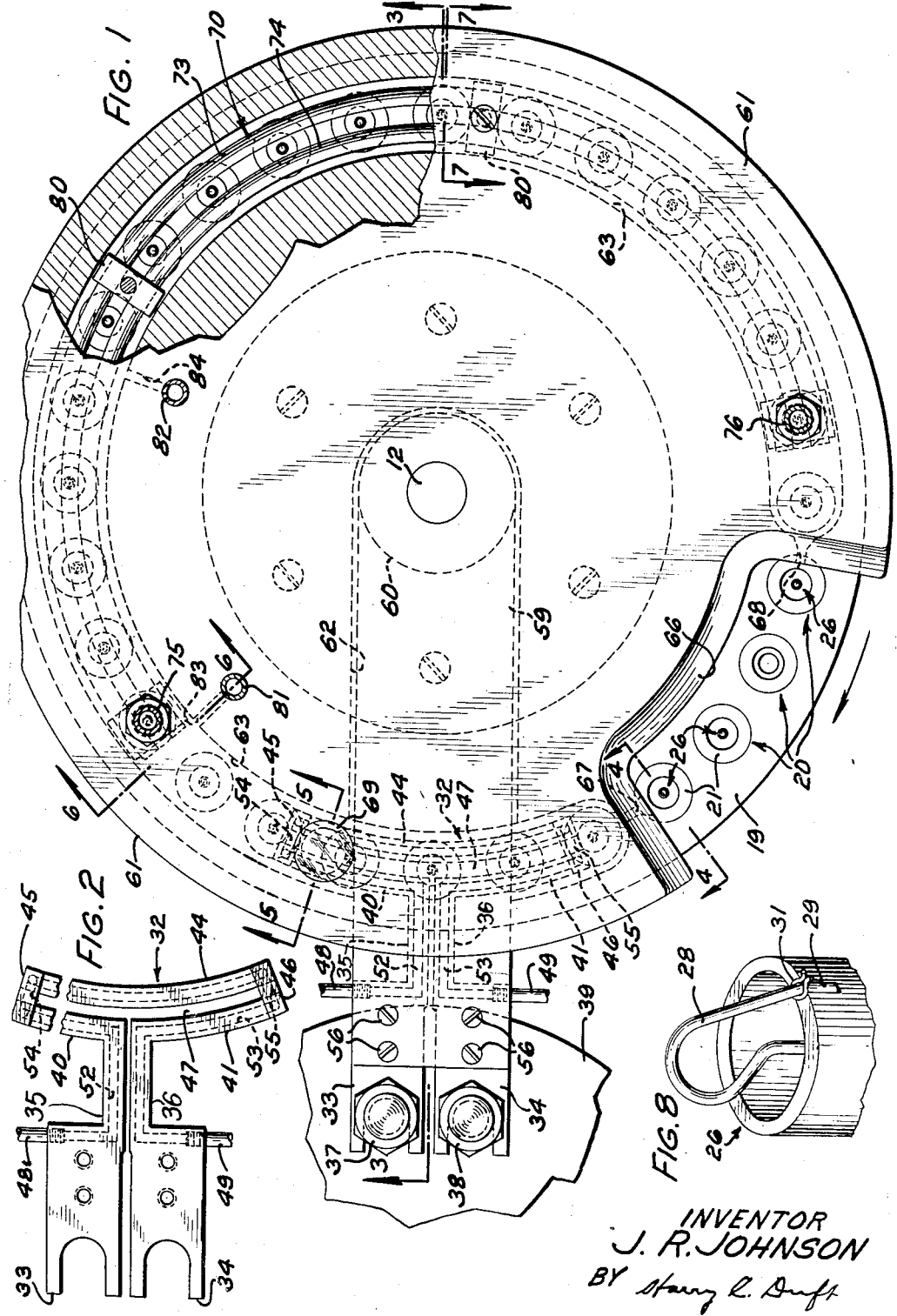
INVENTOR
J. R. JOHNSON
BY
ATTORNEY April 13, 1948. J. R. JOHNSON 2,439,517
INDUCTION HEATING APPARATUS
Filed Nov. 10, 1945 2 Sheets-Sheet 2
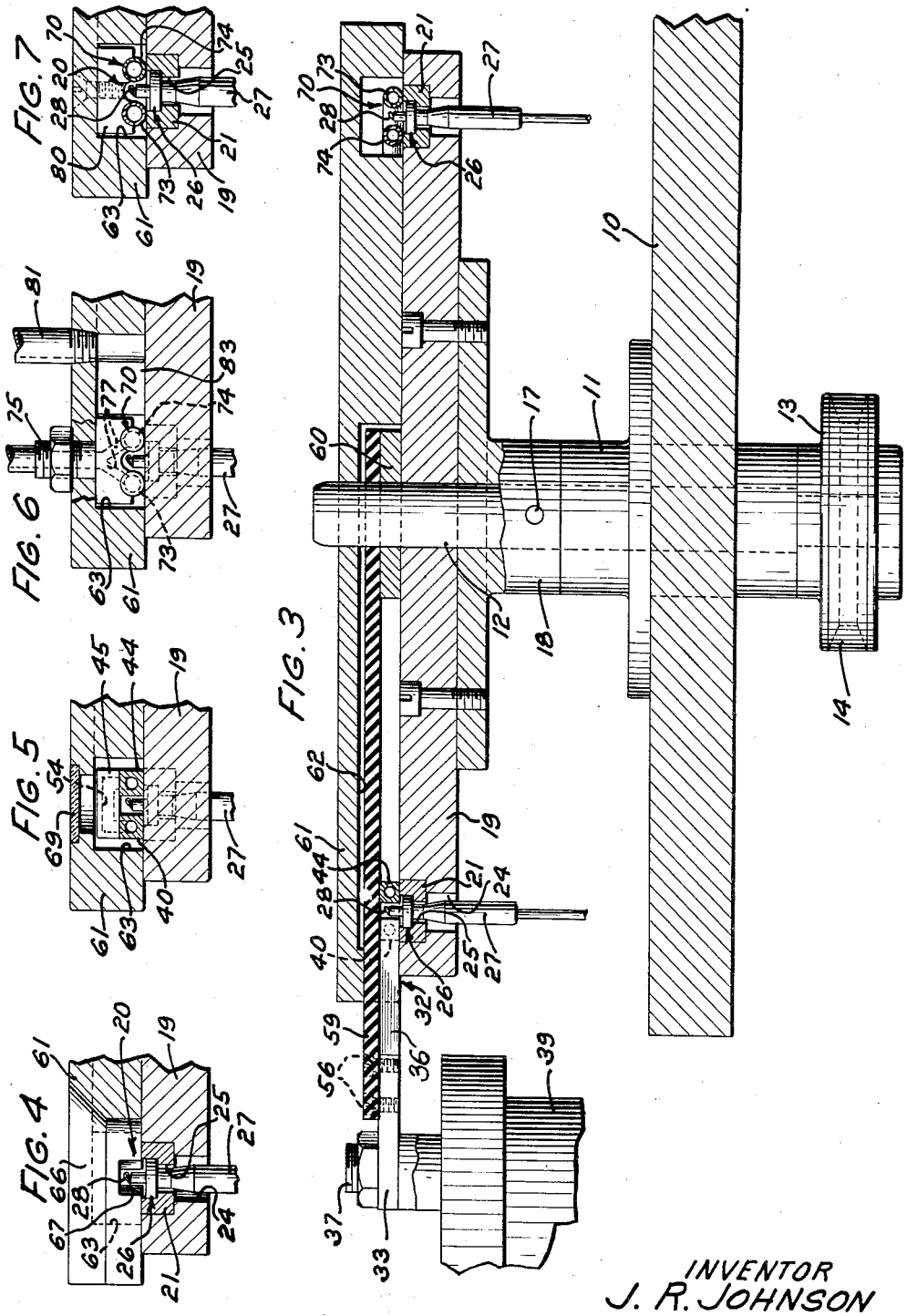
INVENTOR
J. R. JOHNSON
BY
ATTORNEY Patented Apr. 13, 1948

2,439,517

UNITED STATES PATENT OFFICE 2,439,517

INDUCTION HEATING APPARATUS

Joel R. Johnson, Chicago, Ill., assignor to Western Electric Company, Incorporated, New York, N. Y., a corporation of New York Application November 10, 1945, Serial No. 627,817

4 Claims. (Cl. 219—47)

This invention relates to heating apparatus, and more particularly to electrical high frequency induction heated brazing apparatus.

An object of this invention is the provision of a simple and practicable electrical high frequency induction heated brazing apparatus for efficiently and uniformly brazing article assemblages and cooling them in the presence of a non-oxidizing atmosphere.

In accordance with the above object, the present invention, in one embodiment thereof as applied to the brazing of copper loops to copper output leads of magnetron tubes, comprises a continuously rotating table having circularly arranged seats for vertically supporting output leads with the loops to be brazed thereto extending from their upper ends into an annularly shaped tunnel provided in a stationary cover disposed over the rotary table, the cover being cut out at one point to permit the unloading and loading of the output leads from and onto the table. In the movement of the table, the output leads are advanced through a high frequency current induction heated brazing loop comprising a single turn coil of copper tubing, between the side arms of which the output leads are advanced for heating the same and through which water is circulated for cooling purposes. Adjacent the outlet end of the brazing loop within the tunnel is a single turn coil of copper tubing, through which water is circulated and between the side arms of which the output leads move for cooling the same. Connected to the tunnel in which the output leads travel are means for keeping the same filled with hydrogen gas, thus preventing oxidation of the copper output leads while being cooled.

Other objects and advantages of this invention will more fully appear from the following detailed description, taken in connection with the accompanying drawings, in which Fig. 1 is a fragmentary plan view, partly in section, of an electrical high frequency induction heated brazing apparatus embodying the features of the invention;

Fig. 2 is a fragmentary plan view of the induction heated brazing loop;

Fig. 3 is a vertical section, partly in elevation, taken on the line 3—3 of Fig. 1;

Figs. 4, 5, 6 and 7 are enlarged detail vertical sections taken on the lines 4—4, 5—5, 6—6 and 7—7, respectively, of Fig. 1; and Fig. 8 is a fragmentary perspective view, on an enlarged scale, of the upper end of an output lead as it appears previous to the brazing operation.

Referring to the drawings in detail, a bench top or base 10 is provided, upon the upper face of which is secured a hollow flanged bearing member 11 of brass or bronze, which, at its lower end, extends through the base and below the lower face thereof. Rotatably fitted in the bearing member 11 is a vertical shaft 12, to the lower shouldered end of which is fixed a pulley 13, which, in the operation of the apparatus, is continuously driven in a clockwise direction, as indicated by the arrow in Fig. 1, at a predetermined speed by a belt 14 receiving its motion from a suitable source of power (not shown). Fixed to rotate with the shaft 12, as indicated at 17, is a hollow flanged support 18 of brass or bronze and to the upper face of the flange thereof is secured a work-piece carrying table 19 of asbestos lumber, or other suitable material, the lower face of the support 18 bearing and rotating upon the upper face of the fixed bearing member 11.

The table 19, in the present embodiment, has twenty-eight equally spaced circularly arranged work supporting positions 20 concentric with its axis of rotation, each comprising an annular disc of fired lava 21 fitted in the larger diameter of a shouldered vertical aperture 24 (Figs. 3 and 4) in the table, the upper faces of the table and lava disc being in the same plane. Formed in the disc 21 is a shouldered aperture 25, the bottom annular face of the larger diameter of which provides a seat for receiving a shouldered portion of a work-piece, which, in the present embodiment of the invention, is a copper output lead 26 of a magnetron tube. Sealed to the lead 26 is a depending glass stem portion 27, which extends freely through the aperture 24 in the table.

As shown in Fig. 8, wherein the output lead 26 is shown fragmentarily in perspective on a greatly enlarged scale as it appears before completion of the brazing operation, the output lead includes a loop 28 of copper wire extending axially therefrom with its outer end entered in a notch 29 formed in the lead. Wrapped around the wire loop 28, at its outer end adjacent the end portion entered in the notch 29, is a U-shaped piece of silver solder 31 having its side arms pinched together. The amount of solder in the U-shaped piece 31 is just sufficient for the purpose of attaching the outer end of the wire loop 28 in the notch 29 with no excess solder remaining on the lead 26, nor does any of the solder drop into the hollow thereof during the brazing operation.

Referring to Figs. 1, 2 and 3, a high frequency current induction heated brazing coil or loop 32 is provided with terminal portions 33 and 34, which are electrically connected at 37 and 38, respectively, to a suitable electrical transformer 39, shown fragmentarily. The loop 32 is made up of flat irregularly shaped copper members 35 and 36 at the right hand ends (Fig. 2) of which there are arcuate portions 40 and 41, respectively, connected to an arcuate member 44 by cross-members 45 and 46. Thus the member 44 is spaced from the portions 40 and 41 and since the cross members 45 and 46 are secured to the top faces of all of the arcuate portions, there is provided an unobstructed arcuate channel 47 between the arcuate portions 40 and 41 and member 44 for the passage of the upper ends of the output leads 26 and the wire loops 28 to be brazed thereto in a manner to be described hereinafter.

Cooling fluid from a suitable source (not shown) is circulated through the brazing coil or loop 32 by means of an inlet pipe 48 and an outlet pipe 49 communicating with channels 52 and 53, respectively, provided in the loop, the latter channels communicating with channels 54 and 55 formed in the cross-members 45 and 46, respectively.

Secured to the upper face of the brazing loop 32 at 58 (Figs. 1 and 3) is an arm 59 made of phenolized canvas board and to the bottom face of its opposite apertured end is secured a brass bearing disc 60, through which the upper end of the vertical shaft 12 freely extends. The lower faces of the disc 60 and the brazing loop 32 are flat and bear upon the upper face of the output lead carrying table 19. Mounted and bearing upon the upper face of the rotary table 19 is a stationary circular cover plate 61, having the greater portion of its lower face engaging the upper face of the table, the abutting faces being flat to provide an air and gas tight seal therebetween. The cover plate 61 is apertured to freely receive the upper end of the rotatable shaft 12 and has formed in its bottom face a radially extending channel 62 for freely receiving the arm 59 for the greater portion of its length and also the disc 60 attached thereto. Formed in the bottom face of the cover plate 61 adjacent its periphery is a circularly arranged channel or tunnel 63 centered with respect to the work supporting positions 20 of the rotary table 19 and intersecting the channel 62 for permitting the passage of the output leads 26 and the wire loops 28 thereon which are carried by the table to pass underneath the cover plate. The radial channel 62, at its outer end beyond the tunnel 63, is closely fitted to the stationary arm 59 so that the cover plate 61, which is freely removable from the shaft 12 and bears upon the rotating table 19, will be held in a definite fixed position.

Mounted in and extending across the channel 62 and having its opposite ends extending into the tunnel 63 are the arcuate portions 40 and 41 and the arcuate member 44 of the brazing loop 32, which are aligned with the work supporting positions 20 of the rotary table 19. The cover plate 61 is peripherally cut out at 66 to expose successive work supporting positions 20 as the rotary table 19 moves in a clockwise direction (Fig. 1). This cut out 66 is provided to permit the unloading and loading of the output leads 26 from and into the work supporting positions 20 of the moving table 19. Opposite ends of the tunnel 63 are restricted, as indicated at 67 and 68, where they communicate with the opposite ends of the cut out 66 for a purpose to be referred to hereinafter, such passages 67 and 68 being just sufficient to permit the upper ends of the output leads 26 and the wire loops 28 thereon to freely pass therethrough. A window 69 is arranged in the upper wall of the tunnel 63 in the cover plate 61 (Figs. 1 and 5) at a point where the advancing output leads 26 are about to leave the brazing loop 32 so that an attendant may observe results of the brazing operation.

Arranged in the tunnel 63, beginning at a point slightly beyond the window 69, is a cooling coil 70, which extends to a point adjacent the cut out 66. The coil 70 comprises two arcuate-shaped lengths of copper tubing 73 and 74 suitably spaced throughout their length to permit the free passage of the upper ends of the output leads 26 and the wire loops 28 thereon therebetween, as shown in Fig. 6. At their opposite ends, each of the tubes 73 and 74 has suitably fitted and brazed thereto inlet and outlet fittings 75 and 76, which are formed with channels 77 communicating through apertures in the walls of the tubes so that cooling fluid may be circulated therethrough. By means of the fittings 75 and 76 and cross members 80 (Figs. 1 and 7) brazed to the tubes 73 and 74, the cooling coil 70 is suspended from the top wall of the tunnel 63 with the lowermost surfaces of the tubes in free sliding engagement with the upper face of the rotating table 19. Thus, as the brazed output leads 26 are advanced toward the cut out 66 for removal thereat from the apparatus, they are quickly cooled by their passage between the cooling tubes 73 and 74.

For the purpose of preventing oxidation of the copper output leads 26 and the copper wire loop 28 after being heated and brazed together in their passage through the brazing loop 32 and during their subsequent cooling while passing between the cooling tubes 73 and 74 of the coil 70, a non-oxidizing atmosphere, such as hydrogen gas, is continuously introduced into the tunnel 63 through two inlet pipes 81 and 82 (Fig. 1). The pipes 81 and 82 are secured to the cover plate 61 and are supplied from a suitable source (not shown), the pipes communicating with channels 83 and 84, respectively, formed in the cover plate and opening into that portion of the tunnel 63 into which the brazed parts first move after being heated and brazed. This is the point where the tendency of the parts to oxidize will be greatest and, therefore, the heaviest concentration of the non-oxidizing atmosphere should occur thereat, although it is to be understood that the tunnel is at all times filled with this atmosphere. To hold down the leakage of the hydrogen gas from the tunnel 63 to a minimum is the purpose of the restricted passages 67 and 68 previously described, provided in the tunnel at opposite ends of the cut out 66. When the apparatus is not being used to its full capacity, for instance, where enough parts to be brazed are not available for the twenty-eight work positions 20, plugs, such as corks (not shown) may be inserted in the smaller diameters of the apertures 25 in the lava discs 21 to prevent the escape of the hydrogen gas from the tunnel 63 and through such apertures.

In the operation of the apparatus, the table 19 is continuously rotated in the direction of the arrow (Fig. 1) in the manner previously referred to and at a suitable speed. As each work position 20 of the table 19 is uncovered by the cut out 66 of the cover plate 61, the attendant removes the brazed and cooled assemblage comprising the copper output lead 26 and the copper loop 28 from its seat on the lava disc 21 and replaces it with an unbrazed assemblage having a U-shaped piece of silver solder 31 wrapped around the loop 28 in the manner previously described and shown on an enlarged scale in Fig. 8. The movement of the table 19 carries the unbrazed assemblages in succession into the tunnel 63 formed in the cover plate 61 and through the space 47 of the high frequency current brazing coil or loop 32, where a current is induced in the assemblage to heat it up sufficiently to cause the silver solder 31 to fuse and thus braze the copper parts together. In their continued advance through the tunnel 63, the brazed assemblages enter the space between the copper tubes 73 and 74 of the cooling roll 70 and are gradually cooled to a suitable temperature, preferably room temperature, by the time they pass from the tunnel into the cut out 66. During their advance through the brazing loop 32 and their passage through the cooling coil 70, the brazed assemblages are subjected to a non-oxidizing atmosphere continuously introduced into the tunnel 63 through the pipes 81 and 82 and channels 83 and 84, respectively, thus preventing oxidation of the heated parts of the assemblages during the cooling period.

What is claimed is:

1. An electrical induction heating apparatus for heating work pieces comprising means for supporting and conveying a series of work pieces to be heated in succession along a predetermined path, a stationary cover above said means and bearing thereon, said cover having a substantially closed tunnel in its bottom face for the passage of the work pieces along said path, a stationary high frequency current heating loop in one portion of said tunnel between spaced portions of which the work pieces travel whereby a current is induced therein to heat the same, a conduit connected to said cover and communicating with said tunnel for introducing a non-oxidizing atmosphere into said tunnel to prevent oxidation of the heated work pieces during their cooling, and an extending plate attached to said heating loop and fitted in a transverse slot in said cover for maintaining said cover stationary.

2. An electrical induction heating apparatus for heating work pieces comprising a rotatable carrier for supporting and conveying a series of work pieces to be heated in succession along a predetermined path, a stationary cover above said carrier and bearing thereon, said cover having a substantially closed tunnel in its bottom face for the passage of the work pieces along said path, a stationary high frequency current heating means in one portion of said tunnel effective to induce a current in the work pieces to heat the same, a plurality of conduits connected to said cover and communicating with said tunnel for introducing a non-oxidizing atmosphere into said tunnel adjacent said heating means to prevent oxidation of the heated work pieces during their cooling, and an extending plate attached to said heating means and fitted in a transverse slot in said cover for maintaining said cover stationary.

3. An electrical induction heating apparatus for heating work pieces comprising a rotatable carrier for supporting and conveying a series of work pieces to be heated in succession along a predetermined path, a stationary cover above and bearing upon said carrier, said cover having a cut out to permit the unloading and loading of work pieces on said carrier and a substantially closed tunnel intersecting said cut out in its bottom face for the passage of the work pieces along said path, a stationary high frequency current heating means in one portion of said tunnel effective to induce a current in the work pieces to heat the same, a plurality of conduits connected to said cover and communicating with said tunnel for introducing a non-oxidizing atmosphere into said tunnel to prevent oxidation of the heated work pieces during their cooling, and an extending plate attached to said heating means and fitted in a transverse slot in said cover for maintaining said cover stationary.

4. An electrical induction heating apparatus for heating work pieces comprising a rotatable carrier for supporting and conveying a series of work pieces to be heated in succession along a predetermined path, a stationary cover associated with said carrier having a substantially closed channel for the passage of said work pieces along said path, a stationary high frequency current heating loop in one portion of said channel between spaced portions of which the work pieces travel and effective to heat the same, a hollow loop secured to said stationary cover through which a cooling fluid is circulated arranged in and extending throughout the greater portion of said channel between spaced portions of which the work pieces travel for cooling the same, a conduit connected to said stationary cover and communicating with said channel for introducing a non-oxidizing atmosphere into said channel to prevent oxidation of the heated work pieces during their cooling, and an extending plate attached to said heating loop and fitted in a transverse slot in said stationary cover for maintaining said cover stationary.

JOEL R. JOHNSON.

REFERENCES CITED

The following references are of record in the file of this patent:

UNITED STATES PATENTS

| Number | Name | Date |
| --- | --- | --- |
| 1,749,700 | Fourment | Mar. 4, 1930 |
| 1,980,875 | Northrup | Nov. 13, 1934 |
| 2,308,240 | Goodridge | Jan. 12, 1943 |